United States Patent
Masuko et al.

(10) Patent No.: US 8,211,330 B2
(45) Date of Patent: Jul. 3, 2012

(54) LATENT CURING AGENT FOR EPOXY RESIN AND METHOD FOR MANUFACTURING THE SAME

(75) Inventors: Daisuke Masuko, Tochigi (JP); Katsuhiko Komuro, Tochigi (JP); Masahiko Ito, Tochigi (JP); Tadasu Kawashima, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 428 days.

(21) Appl. No.: 12/078,165

(22) Filed: Mar. 27, 2008

(65) Prior Publication Data
US 2008/0249258 A1    Oct. 9, 2008

(51) Int. Cl.
*C09K 3/00* (2006.01)
*C08L 63/00* (2006.01)
*C08G 59/18* (2006.01)
*C08G 59/68* (2006.01)

(52) U.S. Cl. ......... 252/182.13; 252/182.2; 252/182.11; 528/94; 528/117; 528/423; 523/429

(58) Field of Classification Search .............. 424/495; 252/182.13, 182.2, 183.11; 528/94, 117, 528/423; 523/429
See application file for complete search history.

(56) References Cited

U.S. PATENT DOCUMENTS

| | | | |
|---|---|---|---|
| 3,897,371 A * | 7/1975 | Moilliet et al. | 521/62 |
| 5,357,008 A * | 10/1994 | Tsai et al. | 525/526 |
| 5,420,218 A * | 5/1995 | Toribuchi et al. | 526/214 |
| 5,601,794 A * | 2/1997 | Yamamoto et al. | 423/447.2 |
| 6,338,869 B1 * | 1/2002 | Nakano et al. | 427/140 |
| 6,492,437 B1 * | 12/2002 | Musa et al. | 523/456 |

FOREIGN PATENT DOCUMENTS

| JP | A-5-331264 | 12/1993 |
|---|---|---|
| JP | A-2008-255219 | 10/2008 |

OTHER PUBLICATIONS

Machine Translation of JP H05-331264 A.*
Machine translation of JP HO5-331264 A; Sai Sekizen et al; Dec. 14, 1993.*
Japanese Patent Office Action mailed Nov. 30, 2011 issued in Japanese Patent Application No. 2007-099742, with translation.

* cited by examiner

*Primary Examiner* — Karuna P Reddy
(74) *Attorney, Agent, or Firm* — Oliff & Berridge, PLC

(57) ABSTRACT

A latent epoxy resin curing agent is provided which can be manufactured without using an amphiphilic polymer compound requiring a painful trial and error selection process, exhibits excellent solvent resistance and low-temperature fast-curing ability, and contains an imidazole-based compound as a main component. In the latent epoxy resin curing agent containing the imidazole-based compound as a main component, the adduct particles of the epoxy-based compound and the imidazole-based compound are coated with an ethyl cellulose film, and the surface thereof is crosslinked with a polyfunctional isocyanate compound. The epoxy-based compound, the imidazole-based compound, and ethyl cellulose are dissolved in a predetermined saturated hydrocarbon-based solvent under stirring and heating. Then, the epoxy-based compound and the imidazole-based compound are subjected to adduct reaction to obtain a slurry of the adduct. After the slurry was cooled, the polyfunctional isocyanate compound is added thereto to crosslink the ethyl cellulose film.

2 Claims, No Drawings

LATENT CURING AGENT FOR EPOXY RESIN AND METHOD FOR MANUFACTURING THE SAME

BACKGROUND OF THE INVENTION

1. Field of the Invention

The present invention relates to a latent epoxy resin curing agent having excellent solvent resistance and low-temperature fast-curing ability and to a method for manufacturing the same.

2. Description of the Related Art

A latent epoxy resin curing agent having low-temperature fast-curing ability has been proposed in which a coating layer is formed on the surface of particles of an adduct of an imidazole compound and a polyfunctional epoxy compound through reaction with isocyanate (see Japanese Patent Application Laid-Open No. H05-331264). This latent curing agent is prepared as follows. The imidazole compound is added, in the presence of a dispersion stabilizer, to an organic solvent which can dissolve the imidazole compound and the epoxy compound but can not dissolve the adduct to be formed and which has a solubility parameter of 8 to 11. The mixture is heated to dissolve the imidazole compound. Then, the epoxy compound is added thereto and reacted with the imidazole compound to give a dispersion of the adduct particles, and the polyfunctional isocyanate compound is reacted with the adduct particles. The thus-obtained latent curing agent exhibits latency, i.e., does not initiate curing reaction at room temperature when mixed with an epoxy resin to be cured but initiates the curing reaction only after heated.

Meanwhile, it has been considered that an amphiphilic polymer compound having a high affinity both for the formed adduct and for the organic solvent can be preferably used as the dispersion stabilizer to be used upon preparing the latent epoxy resin curing agent described in Japanese Patent Application Laid-Open No. H05-331264 which contains the imidazole compound as a main component.

However, the dispersion-stabilizing ability of such an amphiphilic polymer compound is strongly affected, for example, by the chemical structures of the imidazole compound and epoxy compound and by the properties of the organic solvent. Therefore, when a person skilled in the art selects a suitable amphiphilic polymer compound, an excessive amount of trial and error is required. Moreover, in order to achieve sufficient low-temperature fast-curing ability, there is a strong demand for a latent epoxy resin curing agent that can provide an exothermic peak at 130° C. or less and an exothermic heat of 250 J/g or more in differential scanning calorimetry (DSC) of a thermosetting epoxy resin composition containing this curing agent.

SUMMARY OF THE INVENTION

It is an object of the present invention to solve the foregoing problems in the conventional technology. Specifically, the present invention provides a latent epoxy resin curing agent which can be manufactured without using an amphiphilic polymer compound requiring a painful trial and error selection process, has excellent solvent resistance and low-temperature fast-curing ability, and contains an imidazole-based compound as a main component. The present invention also provides a method for manufacturing this curing agent, in which the curing agent can be obtained in a form of particles in a single batch.

The present inventors have prepared particles of an adduct of an epoxy-based compound and an imidazole-based compound in the presence of ethyl cellulose by using as a solvent a specific saturated hydrocarbon-based solvent that does not dissolve them or is immiscible with them at room temperature but dissolves them when heated. Surprisingly, the inventors have found that ethyl cellulose not only contributes to the stabilization of the dispersion of the adduct particles of the epoxy-based resin and imidazole-based compound but also functions as the shells of the adduct particles. In addition, the ethyl cellulose reacts also with a polyfunctional isocyanate compound, so that excellent solvent resistance can be imparted to a final latent epoxy resin curing agent containing the imidazole-based compound as a main component. Thus, the present invention has been completed.

Accordingly, the present invention provides a latent curing agent for an epoxy resin, including: particles of an adduct of an epoxy-based compound and an imidazole-based compound; and an ethyl cellulose film covering the surfaces of the adduct particles, the ethyl cellulose film being cross-linked with a polyfunctional isocyanate compound.

Moreover, the present invention provides a method for manufacturing the above latent curing agent for an epoxy resin, including: dissolving an epoxy-based compound, an imidazole-based compound, and ethyl cellulose in a saturated hydrocarbon-based solvent having an aniline point of 75 to 85° C. and an initial boiling point of 150 to 230° C. under stirring at a heating temperature of 110 to 130° C.; forming an adduct of the epoxy-based compound and the imidazole-based compound to obtain a slurry of the adduct; cooling the slurry to a temperature of 80 to 100° C.; and adding a polyfunctional isocyanate compound thereto to crosslink an ethyl cellulose film.

In the latent epoxy resin curing agent of the present invention containing the imidazole-based compound as a main component, the adduct particles of the epoxy-based compound and the imidazole-based compound are covered with the ethyl cellulose film, and the surface of the film is crosslinked with the polyfunctional isocyanate compound. Therefore, this curing agent exhibits excellent solvent resistance. In addition to this, the curing agent can provide an exothermic peak at 130° C. or lower and an exothermic heat of 250 J/g or more in DSC measurement of a thermosetting epoxy resin composition containing the same. Moreover, in the manufacturing method of the present invention, the ethyl cellulose contributes to the stabilization of the dispersion of the adduct particles during the formation of the adduct from the epoxy-based compound and the imidazole-based compound, functions as the shells of the adduct particles, and serves as the reaction site for the polyfunctional isocyanate compound. Accordingly, a latent epoxy resin curing agent exhibiting excellent solvent resistance and containing an imidazole-based compound as a main component can be manufactured in a form of particles in a single batch without using an amphiphilic polymer compound requiring a painful trial and error selection process.

DETAILED DESCRIPTION OF THE PREFERRED EMBODIMENTS

A latent epoxy resin curing agent of the present invention containing an imidazole-based compound as a main component includes: adduct particles of an epoxy-based compound and the imidazole-based compound; and an ethyl cellulose film covering the surfaces of the adduct particles, the ethyl cellulose film being crosslinked with a polyfunctional isocyanate compound.

Preferred examples of the epoxy-based compound constituting the adduct particles include compounds and resins having two or more epoxy groups in their molecules. These may be liquid or solid. Specific examples of such an epoxy-based compound include known epoxy resins such as: glycidyl ethers obtained by reacting epichlorohydrin with a polyhydric phenol such as bisphenol A, bisphenol F, bisphenol S, hexahydrobisphenol A, tetramethylbisphenol A, diallylbisphenol A, hydroquinone, catechol, resorcin, cresol, tetrabromobisphenol A, trihydroxybiphenyl, benzophenone, bisresorcinol, bisphenol hexafluoroacetone, tetramethylbisphenol A, tetramethylbisphenol F, tris(hydroxyphenyl)methane, bixylenol, phenol-novolac, or cresol-novolac; polyglycidyl ethers obtained by reacting epichlorohydrin with an aliphatic polyhydric alcohol such as glycerin, neopentyl glycol, ethylene glycol, propylene glycol, butylene glycol, hexylene glycol, polyethylene glycol, or polypropylene glycol; glycidyl ether esters obtained by reacting epichlorohydrin with a hydroxycarboxylic acid such as p-hydroxybenzoic acid or β-hydroxynaphthoic acid; polyglycidyl esters obtained from polycarboxylic acids such as phthalic acid, methylphthalic acid, isophthalic acid, terephthalic acid, tetrahydrophthalic acid, hexahydrophthalic acid, endomethylene tetrahydrophthalic acid, endomethylene hexahydrophthalic acid, trimellitic acid, and polymerized fatty acids; glycidylaminoglycidyl ethers obtained from aminophenols and aminoalkylphenols; glycidylaminoglycidyl esters obtained from aminobenzoic acids; glycidylamines obtained from aniline, toluidine, tribromoaniline, xylylenediamine, diamino cyclohexane, bisaminomethylcyclohexane, 4,4'-diaminodiphenyl methane, and 4,4'-diaminodiphenyl sulfone; and epoxydized polyolefins.

Any imidazole-based compound used in imidazole-based latent curing agents can be appropriately used as the imidazole-based compound constituting the adduct particles. Examples of such an imidazole-based compound include 2-methyl imidazole, 2-undecyl imidazole, 2-heptadecyl imidazole, 1,2-dimethyl imidazole, 2-ethyl-4-methyl imidazole, 2-phenyl imidazole, 2-phenyl-4-methyl imidazole, 1-benzyl-2-methyl imidazole, 1-benzyl-2-phenyl imidazole, 1-cyanoethyl-2-methyl imidazole, 1-cyanoethyl-2-undecyl imidazole, 1-cyanoethyl-2-ethyl-4-methyl imidazole, and 1-cyanoethyl-2-phenyl imidazole.

In the ratio of the epoxy-based compound and the imidazole-based compound used when the adduct particles are formed, when the amount of the epoxy-based compound is too large, the reactivity of the adduct tends to be too low. In contrast, when the amount of the imidazole-based compound is too large, the reactivity of the adduct tends to be excessively high. Therefore, the amount of the imidazole-based compound is preferably 150 to 5 parts by weight, more preferably 100 to 10 parts by weight, and particularly preferably 70 to 25 parts by weight with respect to 100 parts by weight of the epoxy-based compound.

Preferably, the adduct particles are spherical, and the particle size thereof is preferably 1 to 10 μm and more preferably 2 to 7 μm in terms of curability and dispersibility.

In the ethyl cellulose which forms the ethyl cellulose film covering the adduct fine particles, the degree of substitution of three hydroxyl groups in the cellulose skeleton is preferably 2.25 to 2.60, more preferably 2.30 to 2.55, and particularly preferably 2.40 to 2.52, as the average per unit skeleton. When the degree of substitution of the hydroxyl groups is outside the above range, the solubility of the ethyl cellulose in the reaction system is adversely affected. Specific examples of the ethyl cellulose include N300, N200, N100, and N50 available from Hercules Incorporated.

When the used amount of ethyl cellulose is too small, the particle size of the adduct tends to increase, so that the dispersion stability is reduced. When the amount is too large, ethyl cellulose tends not to form the shell and to remain as a residue. Therefore, the amount of ethyl cellulose is preferably 1 to 50 parts by weight, more preferably 2.5 to 25 parts by weight, and particularly preferably 5 to 10 parts by weight with respect to 100 parts by weight of the total of the epoxy-based compound and imidazole-based compound constituting the adduct particles. Note that the presence of the ethyl cellulose film can be confirmed by the presence of a characteristic peak of ethyl cellulose due to thermal decomposition in gas chromatography analysis of a sample.

In the latent epoxy resin curing agent of the present invention, the ethyl cellulose film is crosslinked with the polyfunctional isocyanate compound. Any conventional compound used for microencapsulation of an epoxy-based latent curing agent can be used as the polyfunctional isocyanate compound. Examples of the polyfunctional isocyanate compound include toluene diisocyanate, methylene diphenyl diisocyanate, hydrogenated methylene diphenyl diisocyanate, 1,5-naphthalene diisocyanate, isophorone diisocyanate, hexamethylene diisocyanate, xylylene diisocyanate, hydrogenated xylylene diisocyanate, tetramethylxylene diisocyanate, 1,3,6-hexamethylene triisocyanate, lysine diisocyanate, triphenylmethane triisocyanate, and tris(isocyanatephenyl)thiophosphate. These may be used alone or in combination of two or more thereof.

When the used amount of the polyfunctional isocyanate compound is too small, the solvent resistance of the latent epoxy resin curing agent tends to be insufficient. When the amount thereof is too large, the low-temperature curability thereof tends to deteriorate. Therefore, the amount of the polyfunctional isocyanate compound is preferably 0.5 to 50 parts by weight, more preferably 1 to 20 parts by weight, and particularly preferably 2 to 12 parts by weight with respect to 100 parts by weight of the adduct particles.

The latent epoxy resin curing agent of the present invention can be manufactured in a single batch as follows.

First, the epoxy-based compound, the imidazole-based compound, and ethyl cellulose are dissolved in a saturated hydrocarbon-based solvent having an aniline point of 75 to 85° C., an initial boiling point of 150 to 230° C. under stirring at a heating temperature of 110 to 130° C. Then, the epoxy-based compound and the imidazole-based compound are subjected to adduct reaction to obtain a slurry of the adduct.

The saturated hydrocarbon-based solvent used has the following characteristics. The epoxy-based compound, the imidazole-based compound, and ethyl cellulose do not dissolve therein at room temperature, start dissolving when the temperature exceeds 50° C., and dissolve completely before the temperature reaches 100° C., and a polyfunctional isocyanate compound described later dissolves therein at at least 80 to 100° C. By using such a solvent, the adduct particles can be coated with ethyl cellulose, and the coating can be crosslinked with the polyfunctional isocyanate compound. Specific examples of such a saturated hydrocarbon-based solvent include grade No. 1 kerosene stipulated in JIS (Japanese Industrial Standards), saturated hydrocarbon-based washing solvents (such as: Shellsol MC-311, Shell Chemicals Japan Ltd., and No. 0 solvent-L, NIPPON OIL CORPORATION).

The used amount of the saturated hydrocarbon-based solvent may be determined by taking into consideration the solubility of the epoxy-based compound, the imidazole-based compound, and ethyl cellulose and the concentration and viscosity of the slurry to be formed. Typically, the amount is 300 to 2,000 parts by weight with respect to 100 parts by weight of the total of the above components.

The stirring during the formation of the adduct particles may be performed by means of a propeller stirrer, a homogenizer, or the like and is performed preferably under the condition of 3,000 to 20,000 rpm in order to control the particle size.

The reaction temperature during the formation of the adduct particles is 110 to 130° C. This is because an excessively low reaction temperature tends to results in insufficient reaction and because an excessively high reaction temperature tends to result in the decomposition of the formed adduct.

The adduct reaction is terminated when the reaction mixture turns brown. The reaction is typically completed after heating for 20 minutes to 2 hours. In this manner, the slurry of the adduct particles is obtained.

Next, the slurry of the adduct particles is stirred without heating and is cooled to 80 to 100° C. at which the adduct reaction of the epoxy-based compound and the imidazole-based compound does not substantially occur.

While this temperature is maintained, the polyfunctional isocyanate compound is added to the slurry and allowed to react with the hydroxyl groups in the ethyl cellulose film to crosslink the ethyl cellulose film. Typically, the crosslinking reaction is completed in 20 minutes to 2 hours. After completion of the reaction, the slurry is cooled to room temperature, and the solid is separated through filtration, washed with an organic medium such as hexane, and dried, whereby a powder of latent epoxy resin curing agent excellent in solvent resistance and having a particle size of 1 to 10 µm can be obtained.

The latent epoxy resin curing agent of the present invention can provide a thermosetting epoxy resin composition of low-temperature fast-curing type by adding the curing agent to a thermosetting epoxy resin optionally with other additives (such as a pigment, filler, and silane coupling agent) and stirring the mixture according to a conventional method. Typically, the latent epoxy resin curing agent is added to the thermosetting epoxy resin in an amount of preferably 10 to 100 parts by weight and more preferably 25 to 70 parts by weight with respect to 100 parts by weight of the thermosetting epoxy resin.

Since the latent epoxy resin curing agent excellent in solvent resistance and having low-temperature fast-curing ability is used, this thermosetting epoxy resin composition is excellent in storage stability although it is of a one-component type. In addition to this, the curing agent has an advantage in that a solvent used therewith can be selected from a wide variety of solvents.

Moreover, the thermosetting epoxy resin composition can be used as an anisotropic conductive composition by further adding thereto known conductive particles, such as nickel particles, for anisotropic conductive connection and a known film-forming resin such as phenoxy resin. When formed into a film shape, the thermosetting epoxy resin composition can be used as an anisotropic conductive film. The type, particle size, and amount to be added of the conductive particles and the type, amount to be added, thickness, and the like of the film-forming component may be the same as those in known anisotropic conductive pastes and anisotropic conductive films. An example of the composition of a representative anisotropic conductive paste or film is 8 to 12 parts by weight of the latent epoxy resin curing agent, 50 to 80 parts by weight of phenoxy resin, 20 to 50 parts by weight of an epoxy compound, 5 to 30 parts by weight of epoxy-modified polyolefin, 1 to 20 parts by weight of a silane coupling agent, and 1 to 20 parts by weight of conductive particles. Moreover, other solvents, monomers for dilution, and the like may be appropriately added if needed. Such an anisotropic conductive paste or anisotropic conductive film allows low-temperature short-time connection at 150° C. in about 5 seconds and provides a low electric resistance and a good bonding strength.

EXAMPLES

Hereinbelow, the present invention is specifically described by way of Examples.

Example 1

A three-necked flask made of Teflon (registered trademark) and equipped with a cooling tube was charged with 70 g of JIS grade No. 1 kerosene, 23 g of epoxy resin (JER828, Japan Epoxy Resins Co., Ltd.), 7 g of 2-ethyl-4-methyl imidazole, and 10 g of a 10% solution of ethyl cellulose (N300, Hercules Incorporated, the degree of substitution of hydroxy groups: 2.40 to 2.52). The reaction mixture was heated under stirring at 8,000 rpm. When the temperature of the reaction mixture reached about 50° C., a uniform solution was obtained. The adduct reaction was initiated at about 100° C., and a precipitate started forming. The temperature was further increased to 120° C., and the stirring was continued for 1 hour, whereby a brown slurry was obtained.

Then, the heating was terminated, and the obtained slurry was allowed to cool to 100° C. under stirring. The temperature of the slurry was maintained at 100° C., and 0.9 g of a 45% solution of a polyfunctional isocyanate compound (CORONATE L45, NIPPON POLYURETHANE INDUSTRY CO., LTD., diluting solvent: ethyl acetate) was added dropwise to the slurry under stirring, and the reaction mixture was subjected to crosslinking reaction for 1 hour. After completion of the reaction, the reaction mixture was cooled to room temperature, and the precipitate was separated through filtration, washed with heptane, and dried, whereby 31.9 g of a powder of a latent epoxy resin curing agent having an average particle size of 5 µm was obtained.

Comparative Example 1

The same procedure as in Example 1 was repeated except that the 10% solution of polyfunctional isocyanate compound was not added to the slurry, whereby 31 g of a powder of a latent epoxy resin curing agent having an average particle size of 5 µm was obtained.

Comparative Example 2

The same procedure as in Example 1 was repeated except that ethyl cellulose was not used, whereby a latent epoxy resin curing agent was obtained. In this case, a powder-like product was not obtained, and only the lumps of the product were obtained.

Evaluation Test Examples
<Solvent Resistance Test>

2.4 g of each of the latent epoxy resin curing agents obtained in Example 1 and Comparative Examples 1 and 2 was uniformly mixed with 5.6 g of a 2:8 mixture of a bisphenol A epoxy resin (JER828, product of Japan Epoxy Resins Co., Ltd.) and a bisphenol F epoxy resin (JER807, product of Japan Epoxy Resins Co., Ltd.), and 2 g of a solvent shown in Table 1 (TOL (toluene), ACET (ethyl acetate), MEK (methyl ethyl ketone), or PGMAC (propylene glycol monomethyl ether acetate)), whereby a thermosetting epoxy resin composition was prepared. This composition was charged into a sealed container and left to stand in an oven at 40° C., and the time at which the composition lost its fluidity was measured.

The measured time is shown in Table 1. Moreover, the solvent resistance test results for Reference Example 1 in which a commercially available latent epoxy resin curing agent (HX3941, Asahi Kasei Corporation) was used are also shown in Table 1.

<DSC Measurement>

A thermosetting epoxy resin composition prepared as in the solvent resistance test was subjected to thermal analysis by means of a differential scanning calorimeter (DSC, DSC-60, product of Shimadzu Corporation) to measure the exothermic peak temperature (° C.) and the total exothermic heat (J/g). The results obtained are shown in Table 1. Practically, the exothermic peak falls within the range of preferably 90 to 160° C., and the total exothermic heat is preferably 250 J/g or more. The DSC measurement results for Reference Example 1 in which the commercially available latent epoxy resin curing agent (HX3941, Asahi Kasei Corporation) was used are also shown in Table 1.

TABLE 1

| | Solvent resistance (hour) | | | | DSC | |
|---|---|---|---|---|---|---|
| | | | | | Exothermic peak temp. | Total exothermic |
| | TOL | ACET | MEK | PGMAC | (° C.) | heat (J/g) |
| Example 1 | 24 or more | 24 or more | 24 or more | 24 or more | 126 | 270 |
| Comparative Example 1 | Less than 5 | Less than 24 | Less than 24 | 24 or more | 120 | 300 |
| Comparative Example 2 | Particle-like adduct not obtained | | | | — | — |
| Reference Example 1 | Less than 24 | Less than 24 | Less than 24 | Less than 24 | 120 | 330 |

As described above, the latent epoxy resin curing agent of Example 1 contains the adduct particles covered with ethyl cellulose and crosslinked with the polyfunctional isocyanate compound. As can be seen from the results in Table 1, the curing agent of Example 1 exhibited better solvent resistance than the commercially available latent epoxy resin curing agent of Reference Example 1, and the DSC measurement results of Example 1 were comparable to those of Reference Example 1. Meanwhile, the latent epoxy resin curing agent of Comparative Example 1 which had the ethyl cellulose coating but was not subjected to isocyanate crosslinking exhibited insufficient solvent resistance. In addition, the latent epoxy resin curing agent of Comparative Example 2 which was subjected to isocyanate crosslinking but did not have the ethyl cellulose coating was not obtained as particles.

Example 2

A three-necked flask made of Teflon (registered trademark) and equipped with a cooling tube was charged with 179 g of Shellsol MC-311 (product of Shell Chemicals Japan Ltd.), 14 g of an epoxy resin (EPICOAT 828, Japan Epoxy Resins Co., Ltd.), 6 g of 2-ethyl-4-methyl imidazole, and 10 g of a 10% solution of ethyl cellulose (N300, Hercules Incorporated, the degree of substitution of hydroxy groups: 2.40 to 2.52). The reaction mixture was heated under stirring at 13,500 rpm. When the temperature of the reaction mixture reached about 50° C., a uniform solution was obtained. The adduct reaction was initiated at about 100° C., and a precipitate started forming. The temperature was further increased to 120° C., and the stirring was continued for 1 hour, whereby a brown slurry was obtained.

Then, the heating was terminated, and the obtained slurry was allowed to cool to 100° C. under stirring. The temperature of the slurry was maintained at 100° C., and 22 g of a solution of a polyfunctional isocyanate compound (CORONATE L45E, NIPPON POLYURETHANE INDUSTRY CO., LTD., diluting solvent: ethyl acetate, corresponding to a solid content of 9.9 g) was added dropwise to the slurry under stirring, and the reaction mixture was subjected to crosslinking reaction for 1 hour. After completion of the reaction, the reaction mixture was cooled to room temperature, and the precipitate was separated through filtration, washed with heptane, and dried, whereby 30.9 g of a powder of a latent epoxy resin curing agent having an average particle size of 2 to 5 µm was obtained.

Comparative Example 3

The same procedure as in Example 2 was repeated except that ethyl cellulose was not used, whereby a latent epoxy resin curing agent was obtained. In this case, a powder-like product was not obtained, and only the lumps of the product were obtained.

Comparative Example 4

The same procedure as in Example 2 was repeated except that xylene was used in place of Shellsol MC-311, whereby a latent epoxy resin curing agent was obtained. In this case, a powder-like product was not obtained, and only the lumps of the product were obtained.

Comparative Example 5

In order to obtain a latent epoxy resin curing agent, the same procedure as in Example 2 was repeated except that methyl isobutyl ketone was used in place of Shellsol MC-311. However, no precipitation of product occurred, and therefore an adduct was not obtained.

Comparative Example 6

The same procedure as in Example 2 was repeated except that the solution of the polyfunctional isocyanate compound was not added to the slurry, whereby 21 g of a powder of a latent epoxy resin curing agent having an average particle size of 2 to 5 µm was obtained.

Evaluation Test Examples

<Solvent Resistance Test>

1.2 g of each of the latent epoxy resin curing agents obtained in Example 2 and Comparative Examples 3 to 6 was uniformly mixed with 2.8 g of a 2:8 mixture of a bisphenol A epoxy resin (JER828, product of Japan Epoxy Resins Co., Ltd.) and a bisphenol F epoxy resin (JER807, product of Japan Epoxy Resins Co., Ltd.), 2.8 g of a bis-A type liquid epoxy resign compound (YL980, product of Japan Epoxy Resins Co., Ltd.), and 1 g of a solvent shown in Table 2 (TOL (toluene), ACET (ethyl acetate), MEK (methyl ethyl ketone), or PGMAC (propylene glycol monomethyl ether acetate)), whereby a thermosetting epoxy resin composition was prepared. This composition was charged into a sealed container and left to stand in an oven at 40° C., and the time at which the composition lost its fluidity was measured. The measured time is shown in Table 2. Moreover, the solvent resistance test results of Reference Example 2 in which a commercial latent epoxy resin curing agent (HX3941, Asahi Kasei Corporation) was used are also shown in Table 2.

<DSC Measurement>

A thermosetting epoxy resin composition prepared as in the solvent resistance test was subjected to thermal analysis by means of a differential scanning calorimeter (DSC, DSC-60, product of Shimadzu Corporation) to measure the exothermic peak temperature (° C.) and the total exothermic heat (J/g). The results obtained are shown in Table 2. Practically, the exothermic peak falls within the range of preferably 90 to 160° C., and the total exothermic heat is preferably 250 J/g or more. The DSC measurement results of Reference Example 2 in which the commercially available latent epoxy resin curing agent (HX3941, Asahi Kasei Corporation) was used are also shown in Table 2.

TABLE 2

| | Solvent resistance (hour) | | | | DSC | |
| --- | --- | --- | --- | --- | --- | --- |
| | | | | | Exothermic peak temp. (° C.) | Total exothermic heat (J/g) |
| | TOL | ACET | MEK | PGMAC | | |
| Example 2 | 192 | 48 | 24 | 192 | 128 | 270 |
| Comparative Example 3 | Particle-like adduct not obtained | | | | — | — |
| Comparative Example 4 | Particle-like adduct not obtained | | | | — | — |
| Comparative Example 5 | Reaction product not obtained | | | | — | — |
| Comparative Example 6 | 7 | 7 | 7 | 7 | 120 | 300 |
| Reference Example 2 | 9 | 5 | 5 | 31 | 120 | 330 |

As described above, the latent epoxy resin curing agent of Example 2 contains the adduct particles coated with ethyl cellulose and crosslinked with the polyfunctional isocyanate compound. As can be seen from the results in Table 2, the curing agent of Example 2 exhibited better solvent resistance than the latent epoxy resin curing agent of Reference Example 2, and the DSC measurement results of Example 2 were comparable to those of Reference Example 2. Meanwhile, in the latent epoxy resin curing agent of Comparative Example 3 which was subjected to isocyanate crosslinking but did not have the ethyl cellulose coating, and in the latent epoxy resin curing agent of Comparative Example 4 in which xylene was used in place of the kerosene, the latent epoxy resin curing agents were not obtained as particles. Moreover, in the latent epoxy resin curing agent of Comparative Example 5 in which methyl ethyl ketone was used in place of the kerosene, a reaction product was not obtained. In addition, in the latent epoxy resin curing agent of Comparative Example 6 which had the cellulose coating but was not subjected to isocyanate crosslinking, the solvent resistance was insufficient.

In the latent epoxy resin curing agent of the present invention, the adduct particles of the epoxy-based compound and the imidazole-based compound are coated with the ethyl cellulose film, and the surface thereof is crosslinked with the polyfunctional isocyanate compound. Therefore, the curing agent exhibits excellent solvent resistance and low-temperature fast-curing ability. Accordingly, the curing agent can cure a thermosetting epoxy resin composition at a relatively low temperature in a short period of time, so that the curing agent is useful as an electronic material-bonding material that can cure at a low temperature and a fast rate.

The entire disclosure of the specification, claims and summary of Japanese Patent Application No. 2007-99742 filed on Apr. 5, 2007 is hereby incorporated by reference.

What is claimed is:

1. A method for manufacturing a latent curing agent for an epoxy resin, the latent curing agent for the epoxy resin comprising particles of an adduct of an epoxy-based compound and an imidazole-based compound, and an ethyl cellulose film crosslinked with a polyfunctional isocyanate compound, the cross-linked ethyl cellulose film covering surfaces of the adduct particles, the method comprising:

dissolving the epoxy-based compound, the imidazole-based compound, and ethyl cellulose in which the degree of substitution of three hydroxyl groups in a cellulose skeleton of the ethyl cellulose is 2.25 to 2.60, in a saturated hydrocarbon-based solvent having an aniline point of 75 to 85° C. and an initial boiling point of 150 to 230° C. under stirring at a heating temperature of 110 to 130° C.;

forming the adduct of the epoxy-based compound and the imidazole-based compound to obtain a slurry of the adduct particles;

cooling the slurry of adduct particles to a temperature of 80 to 100° C.; and following the cooling, adding a polyfunctional isocyanate compound and allowing the polyfunctional isocyanate to cross-link the ethyl cellulose to form the cross-linked ethyl cellulose film on the surface of the adduct particles.

2. The method according to claim 1, wherein the hydrocarbon-based solvent is kerosene.

* * * * *